(12) United States Patent
Hashimoto et al.

(10) Patent No.: US 10,862,366 B2
(45) Date of Patent: Dec. 8, 2020

(54) ROTATING ELECTRIC MACHINE

(71) Applicant: DENSO CORPORATION, Kariya (JP)

(72) Inventors: Naoki Hashimoto, Kariya (JP); Nobuo Isogai, Kariya (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 16/292,711

(22) Filed: Mar. 5, 2019

(65) Prior Publication Data
US 2019/0280554 A1 Sep. 12, 2019

(30) Foreign Application Priority Data

Mar. 9, 2018 (JP) .................................. 2018-042862

(51) Int. Cl.
| | |
|---|---|
| *H02K 5/22* | (2006.01) |
| *H02K 11/33* | (2016.01) |
| *H02K 7/00* | (2006.01) |
| *H02K 9/22* | (2006.01) |
| *H02P 27/06* | (2006.01) |

(Continued)

(52) U.S. Cl.
CPC ................ *H02K 5/22* (2013.01); *H01R 3/00* (2013.01); *H02K 5/225* (2013.01); *H02K 7/003* (2013.01); *H02K 9/22* (2013.01); *H02K 11/048* (2013.01); *H02K 11/05* (2016.01); *H02K 11/33* (2016.01); *H02K 11/40* (2016.01); *H02K 19/10* (2013.01); *H02P 27/06* (2013.01)

(58) Field of Classification Search
CPC ............ H02K 5/00; H02K 5/22; H02K 5/225; H02K 11/00; H02K 11/04; H02K 11/046; H02K 11/048; H02K 11/05; H02K 11/33; H02K 11/40; H02K 19/00; H02K 19/10; H02K 9/00; H02K 9/22; H02P 27/00; H02P 27/003; H02P 27/06; H01R 3/00
See application file for complete search history.

(56) References Cited

U.S. PATENT DOCUMENTS

| | | | | |
|---|---|---|---|---|
| 6,285,100 B1 * | 9/2001 | Pflueger | ............... | H02K 11/046 310/64 |
| 2011/0273042 A1 * | 11/2011 | Isoda | ..................... | H02K 5/225 310/63 |

(Continued)

FOREIGN PATENT DOCUMENTS

JP  4500300 B2  7/2010

*Primary Examiner* — Tran N Nguyen
(74) *Attorney, Agent, or Firm* — Oliff PLC

(57) ABSTRACT

A rotating electric machine includes a rotating shaft, a rotor, a stator, a housing, control modules and fixing members. The housing, which is grounded, rotatably supports the rotating shaft and accommodates the rotor and the stator. The control modules are arranged around the rotating shaft and adjacent to one another. Each of the control modules includes switching elements, a supporting part that supports the switching elements, and at least one connection part having a ground terminal formed therein. The fixing members are provided to fix the connection parts of the control modules to the housing. Each adjacent pair of the connection parts respectively belonging to two different ones of the control modules are together fixed to the housing by a corresponding one of the fixing members; the ground terminals formed in the adjacent pair of the connection parts are together electrically connected to the housing.

6 Claims, 7 Drawing Sheets

(51) Int. Cl.
*H02K 11/40* (2016.01)
*H01R 3/00* (2006.01)
*H02K 11/05* (2016.01)
*H02K 19/10* (2006.01)
*H02K 11/04* (2016.01)

(56) References Cited

U.S. PATENT DOCUMENTS

2014/0354087 A1* 12/2014 Kato ........................ H02K 5/02
310/43
2017/0179794 A1 6/2017 Okamura

* cited by examiner

ROTATING ELECTRIC MACHINE

CROSS-REFERENCE TO RELATED APPLICATION

This application is based on and claims priority from Japanese Patent Application No. 2018-42862 filed on Mar. 9, 2018, the contents of which are hereby incorporated by reference in their entirety into this application.

BACKGROUND

1 Technical Field

The present disclosure relates to rotating electric machines.

2 Description of Related Art

There are known rotating electric machines that generate torque upon being supplied with electric power and generate electric power upon being supplied with torque. For example, Japanese Patent Publication No. JP4500300B2 discloses a rotating electric machine that includes a machine main body, which includes a stator and a rotor, and a control section for controlling electric power supplied from an external battery to the machine main body.

In the rotating electric machine disclosed in the above patent document, the control section includes three control modules that are individually formed. Each of the control modules includes a pair of switching elements electrically connected with the battery and a pair of heat sinks electrically connected with the switching elements. Moreover, each of the heat sinks has a connection part that is mounted to a housing in which both the stator and the rotor are accommodated.

However, in the rotating electric machine disclosed in the above patent document, the heat sinks, which are electrically connected with the switching elements, have a different electric potential from the housing. Therefore, the heat sinks are mounted to the housing by means of bolts with insulating members provided between the heat sinks and the housing. Consequently, when the insulating members are damaged due to aging deterioration, leakage paths of electric current may be formed upon exposure of the rotating electric machine to water, thereby making it impossible to ensure electrical insulation of the control modules.

SUMMARY

According to the present disclosure, there is provided a rotating electric machine which includes a rotating shaft, a rotor, a stator, a housing, a plurality of control modules and a plurality of fixing members. The rotor is fixed on the rotating shaft to rotate together with the rotating shaft. The stator is provided radially outside the rotor and includes a stator coil. The housing rotatably supports the rotating shaft and accommodates both the rotor and the stator therein. The housing is grounded. The control modules are capable of supplying multi-phase alternating current to the stator coil and rectifying multi-phase alternating current generated in the stator coil into direct current. The control modules are arranged around the rotating shaft and adjacent to one another. Each of the control modules includes a plurality of switching elements electrically connected with the stator coil, a supporting part that supports the switching elements, and at least one connection part fixed to the housing and having formed therein a ground terminal via which the switching elements are grounded. The fixing members are provided to fix the connection parts of the control modules to the housing. Each adjacent pair of the connection parts respectively belonging to two different ones of the control modules are together fixed to the housing by a corresponding one of the fixing members; the ground terminals formed in the adjacent pair of the connection parts are together electrically connected to the housing.

With the above configuration, all the connection parts of the control modules have the same electrical potential as the housing, i.e., the ground potential. Therefore, in fixing the connection parts of the control modules to the housing, it is unnecessary to provide any insulating members between the connection parts and the housing. Consequently, it becomes possible to prevent any leakage paths of electric current from being formed in the rotating electric machine due to aging deterioration of insulating members. As a result, it becomes possible to ensure insulation properties of the control modules over a long period of time.

DESCRIPTION OF EMBODIMENT

Figure 1:
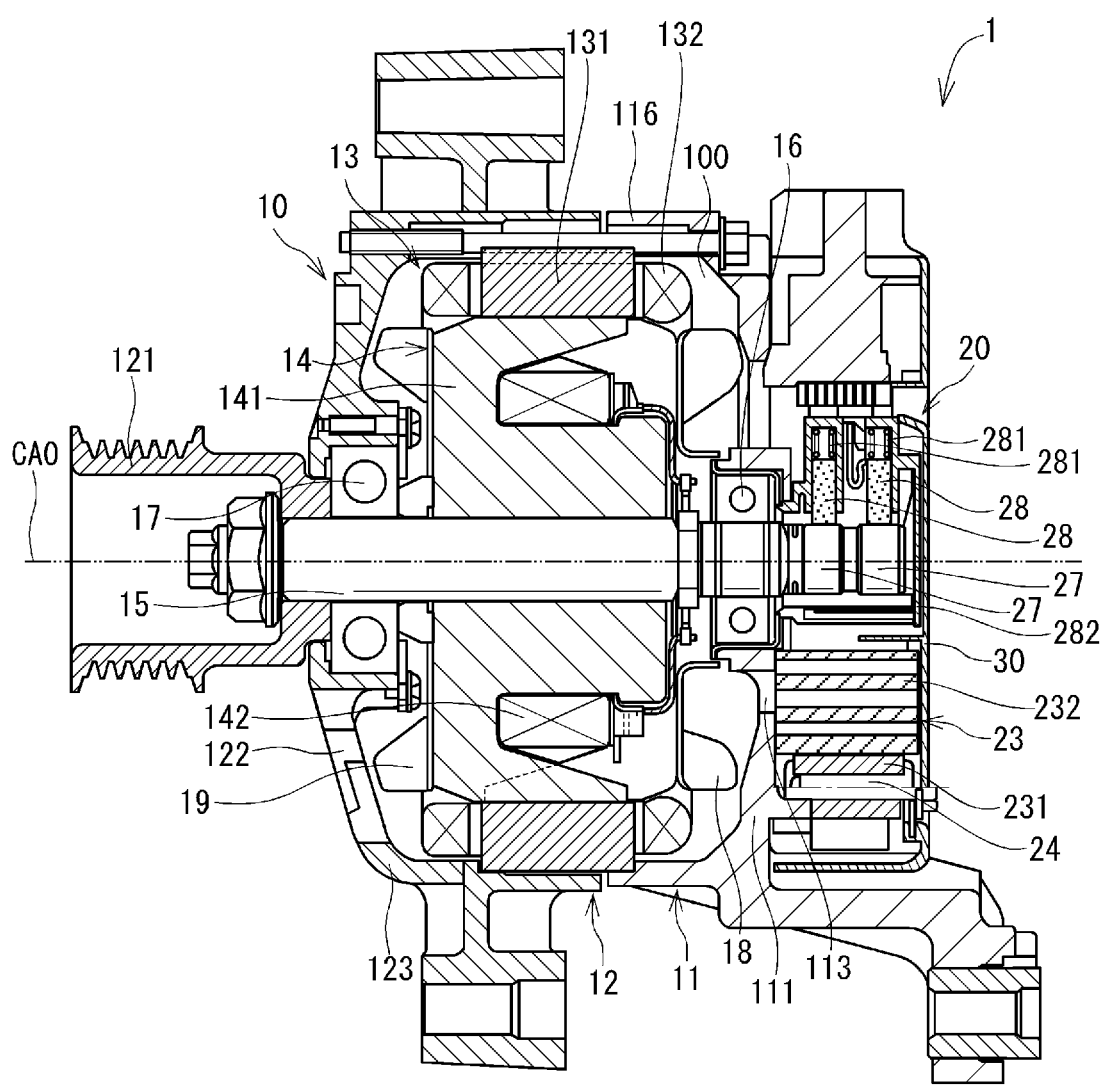
FIG. 1 is a cross-sectional view of a rotating electric machine according to an exemplary embodiment.

FIG. 1 shows the overall configuration of a rotating electric machine 1 according to an exemplary embodiment. In the present embodiment, the rotating electric machine 1 is designed to be used in, for example, a vehicle. Moreover, the rotating electric machine 1 is configured as a motor-generator to selectively operate in a motor mode and a generator mode. In the motor mode, the rotating electric machine 1 generates, using electric power supplied from a battery 5 (see FIG. 2), drive power (or torque) for driving the vehicle. On the other hand, in the generator mode, the rotating electric machine 1 generates, using drive power supplied from an engine (not shown) of the vehicle, electric power for charging the battery 5.

As shown in FIG. 1, the rotating electric machine 1 includes a machine main body 10, a control section 20 and a cover 30.

The machine main body 10 is capable of generating torque upon being supplied with electric power and generating electric power upon being supplied with torque. The machine main body 10 includes a first frame 11, a second frame 12, a stator 13, a rotor 14, a rotating shaft 15, bearings 16 and 17, and cooling fans 18 and 19. In addition, the first and second frames 11 and 12 together correspond to a □housing□.

The first frame 11 is substantially cup-shaped (i.e., concave in shape). The first frame 11 has a bottom part 111 in which the bearing 16 is provided to rotatably support one end portion (i.e., a right end portion in FIG. 1) of the rotating shaft 15.

On the opposite side of the bottom part 111 to the second frame 12, i.e., on the outside of the first frame 11, there is provided the control section 20.

Figure 3:
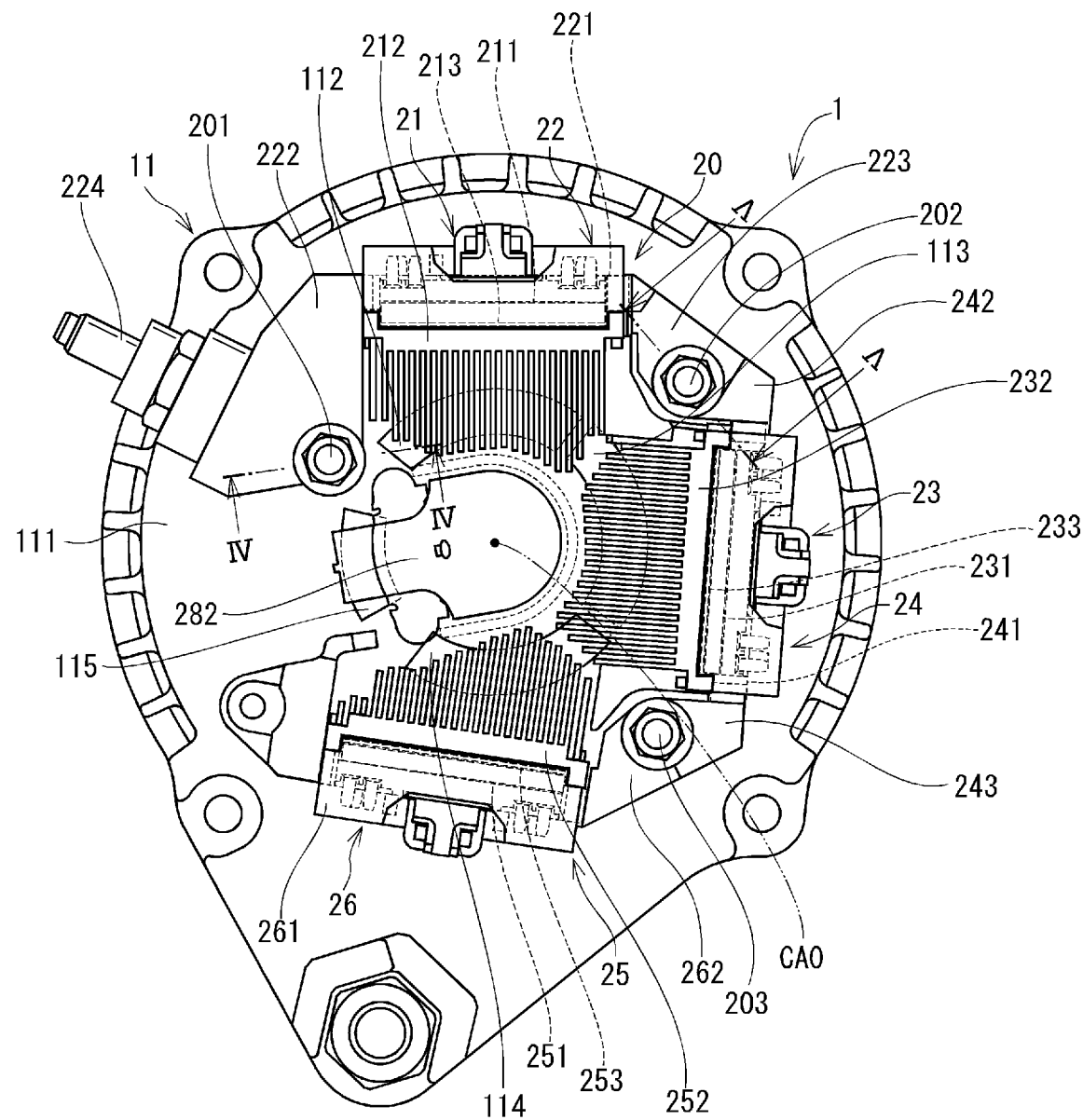
FIG. 3 is a schematic view of the rotating electric machine along the rotation axis of a rotating shaft of the machine from a cover side, omitting the cover and showing control modules of a control section of the machine.

As shown in FIG. 3, in the bottom part 111 of the first frame 11, there are formed four ventilation holes (i.e., through-holes) 112, 113, 114 and 115 through which cooling air can flow from the outside to the inside of the first frame 11. Moreover, of the four ventilation holes 112-115, the ventilation holes 112, 113 and 114 are located so that when viewed in a direction along a rotation axis CAO of the rotating shaft 15, the ventilation holes 112, 113 and 114 respectively overlap heat sinks 212, 232 and 252 provided in the control section 20. The heat sinks 212, 232 and 252 will be described later. In addition, in the present embodiment, the first frame 11 is grounded.

Referring back to FIG. 1, the second frame 12 is also substantially cup-shaped (i.e., concave in shape). The first and second frames 11 and 12 are arranged to have their openings communicating with each other. Consequently, in the first and second frames 11 and 12, there is formed an accommodation space 100 in which the stator 13, the rotor 14 and the rotating shaft 15 are accommodated. To a bottom part of the second frame 12, there is mounted a connection part (e.g., a pulley) 121 that can be mechanically connected with a crankshaft (not shown) of the engine. Moreover, in the bottom part of the second frame 12, there is provided the bearing 17 to rotatably support another end portion (i.e., a left end portion in FIG. 1) of the rotating shaft 15. In addition, in the bottom part of the second frame 12, there is formed a ventilation hole (i.e., through-hole) 122 through which cooling air can flow from the outside to the inside of the second frame 12.

The first frame 11 has a tubular part 116 that extends from the bottom part 111 of the first frame 11 toward the second frame 12. Similarly, the second frame 12 has a tubular part 123 that extends from the bottom part of the second frame 12 toward the first frame 11.

The stator 13 is provided radially inside both the tubular part 116 of the first frame 11 and the tubular part 123 of the second frame 12 and radially outside the rotor 14.

Figure 2:
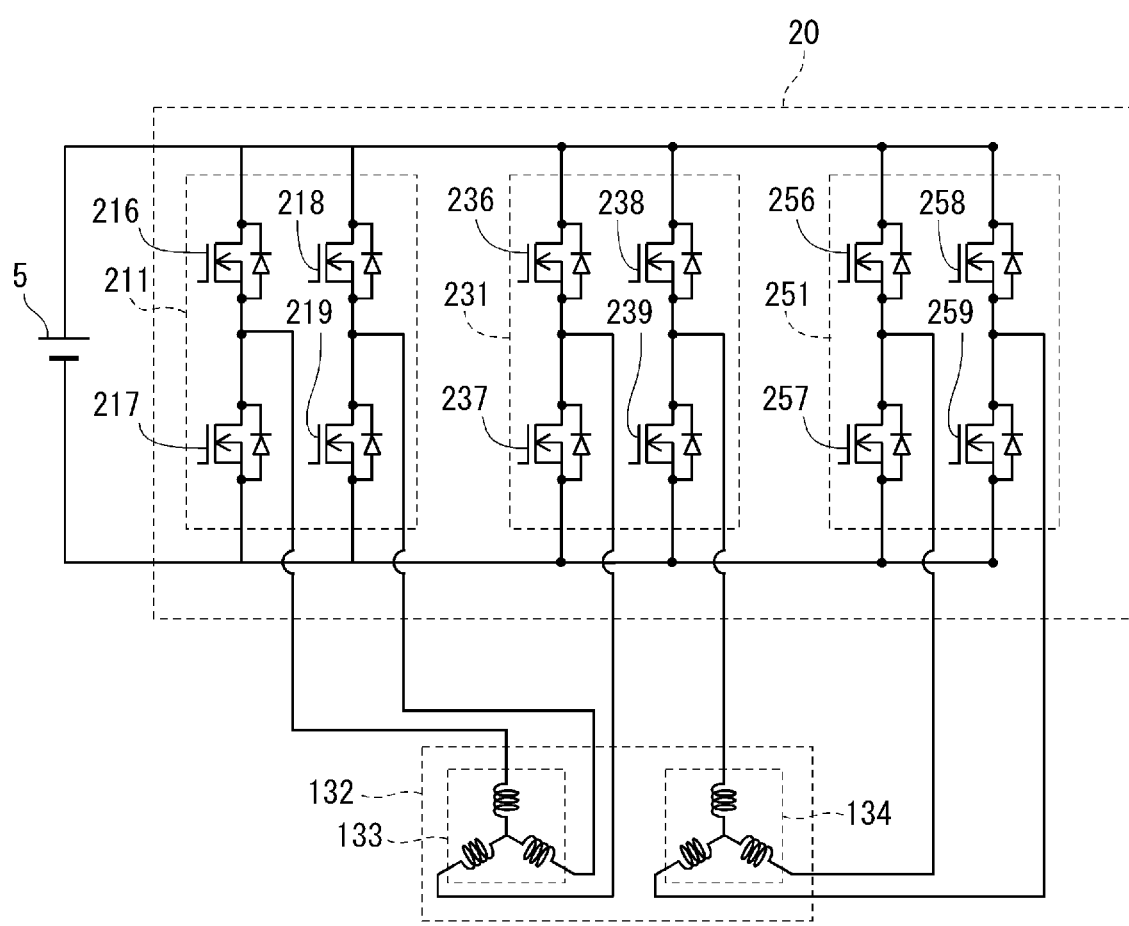
FIG. 2 is a circuit diagram of the rotating electric machine.

The stator 13 includes an annular stator core 131 and stator coils 132 wound on the stator core 131. More particularly, in the present embodiment, as shown in FIG. 2, the stator coils 132 consist of a first three-phase stator coil 133 and a second three-phase stator coil 134.

In addition, it should be noted that the number of phases of the stator coils 132 may alternatively be two, or four or more. It also should be noted that the number of the stator coils 132 included in the stator 13 may alternatively be one, or three or more.

In the motor mode of the rotating electric machine 1, the stator 13 creates a rotating magnetic field upon three-phase alternating current flowing in the stator coils 132. On the other hand, in the generator mode of the rotating electric machine 1, the stator 13 generates three-phase alternating current upon magnetic flux, which is generated by the rotor 14, crossing the stator coils 132.

The rotor 14 is rotatably provided radially inside the stator 13. The rotor 14 includes a rotor core 141 and a rotor coil 142 wound on the rotor core 141. The rotor 14 forms magnetic poles upon direct current (i.e., excitation current) flowing in the rotor coil 142.

The rotating shaft 15 is fixedly inserted in a center hole of the rotor core 141 so that the rotor 14 rotates together with the rotating shaft 15. In other words, the rotor 14 is fixed on the rotating shaft 15 to rotate together with the rotating shaft 15. As described previously, the end portions of the rotating shaft 15 are rotatably supported respectively by the bearings 16 and 17. In addition, the rotating shaft 15 rotates about the rotation axis CAO thereof.

The cooling fan 18 is fixed to a first frame 11-side end surface of the rotor core 141, and thus located between the rotor core 141 and the bearing 16 in the direction of the rotation axis CAO of the rotating shaft 15. On the other hand, the cooling fan 19 is fixed to a second frame 12-side end surface of the rotor core 141, and thus located between the rotor core 141 and the bearing 17 in the direction of the rotation axis CAO of the rotating shaft 15. That is, both the cooling fans 18 and 19 are provided so as to rotate together with the rotor 14 and the rotating shaft 15, thereby producing a flow of the cooling air for cooling the rotating electric machine 1.

The control section 20 is provided outside the machine main body 10. More specifically, the control section 20 is located on the opposite side of the bottom part 111 of the first frame 11 to the accommodation space 100.

The control section 20 includes a first control module 21, a second control module 23, a third control module 25, a pair of slip rings 27 and a pair of brushes 28.

In the motor mode of the rotating electric machine 1, the control section 20 controls the supply of electric power from the battery 5 to the machine main body 10. On the other hand, in the generator mode of the rotating electric machine 1, the control section 20 rectifies three-phase alternating current generated in the machine main body 10 into direct current and supplies the resultant direct current to the battery 5.

The first control module 21 is an assembly of components for forming a first inverter circuit and a first rectification circuit of the rotating electric machine 1. As shown in FIG. 3, the first control module 21 includes a power module 211, the aforementioned heat sink 212, and a busbar assembly 22.

The power module 211 is a switching element module which includes four switching elements for forming the first inverter circuit and the first rectification circuit, more particularly four MOSFETs 216, 217, 218 and 219 as shown in FIG. 2 in the present embodiment. The MOSFETs 216 and 217 are electrically connected in series with each other such that the source of the MOSFET 216 is electrically connected to the drain of the MOSFET 217. Similarly, the MOSFETs 218 and 219 are electrically connected in series with each other such that the source of the MOSFET 218 is electrically connected to the drain of the MOSFET 219.

As shown in FIG. 3, the heat sink 212 is provided on the rotation axis CAO side of the power module 211, i.e., on the radially inner side of the power module 211. In other words, the heat sink 212 is located closer than the power module 211 to the rotation axis CAO of the rotating shaft 15. The heat sink 212 is made of metal and configured to dissipate heat generated in the power module 211. More specifically, the heat sink 212 is configured to have a plurality of plate-shaped fins arranged parallel with each other in a direction substantially perpendicular to the rotation axis CAO of the rotating shaft 15.

In the present embodiment, between the power module 211 and the heat sink 212, there is provided an insulative adhesive 213 that corresponds to a □joining member□. The insulative adhesive 213 joins the heat sink 212 to the power module 211 while electrically insulating the heat sink 212 from the power module 211.

The busbar assembly 22 is an assembly of components for wiring and insulatively supporting the power module 211. The busbar assembly 22 includes a busbar (not shown) electrically connected with the power module 211, a supporting part 221, connection parts 222 and 223 and a power supply terminal 224.

In the present embodiment, the supporting part 221 and the connection parts 222 and 223 are integrally formed of resin into one piece. Moreover, the busbar assembly 22 is joined to the heat sink 212 by heat-caulking. More specifically, the busbar assembly 22 is joined to the heat sink 212 by caulking the resin-made supporting part 221 and connection parts 222 and 223 of the busbar assembly 22 to the heat sink 212 while heating the supporting part 221.

The supporting part 221 is provided, on the opposite side of the power module 211 to the heat sink 212 (i.e., on the radially outer side of the power module 211), to support the power module 211. The supporting part 221 has a plurality of terminals 225 (see FIG. 6) on its opposite side to the power module 211 (i.e., on its radially outer side); the terminals 225 are electrically connected with the MOSFETs 216-219 of the power module 211.

Figure 4:
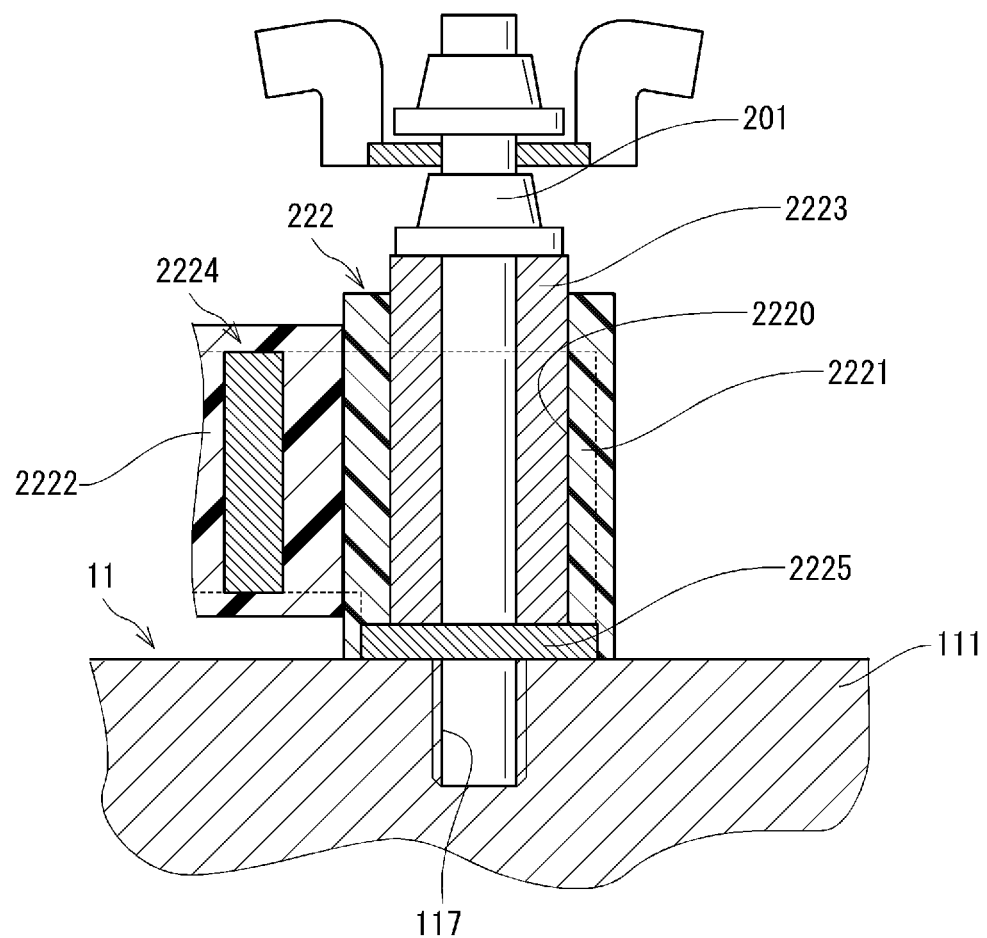
FIG. 4 is a cross-sectional view of the rotating electric machine taken along the line IV-IV in FIG. 3.
Figure 6:
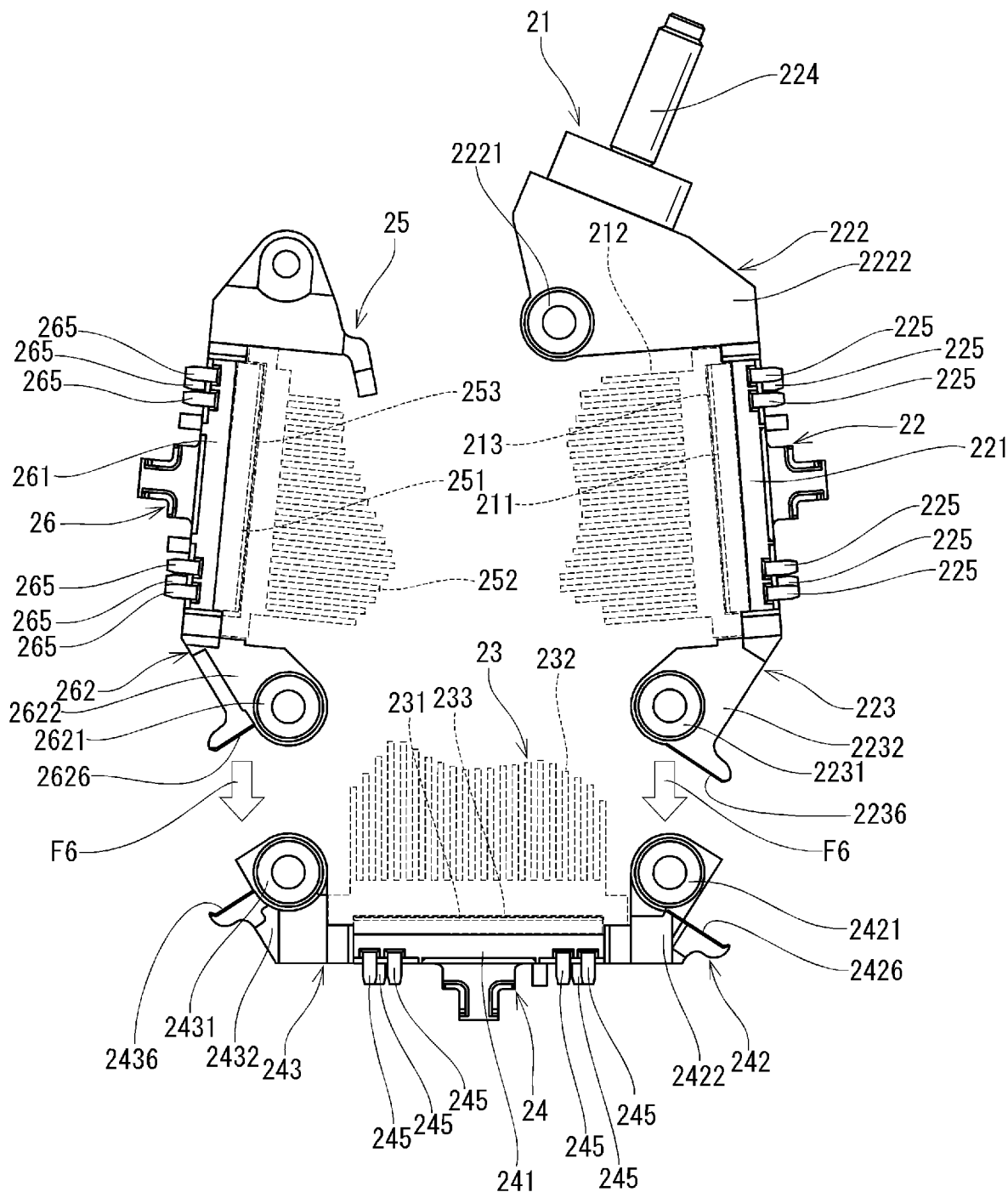
FIG. 6 is a schematic view illustrating busbar assemblies of the control modules in a state of being assembled to each other.

The connection part 222 is provided on the power supply terminal 224 side of the supporting part 221. As shown in FIGS. 4 and 6, the connection part 222 includes a tubular portion 2221 and an intermediate portion 2222.

The tubular portion 2221 is tubular-shaped to have a through-hole 2220 formed therein. In the through-hole 2220, there is inserted a tubular member 2223 that is made of metal. The intermediate portion 2222 extends between the tubular portion 2221 and the supporting part 221 to connect them.

In the intermediate portion 2222 and the tubular portion 2221, there is inserted a ground terminal 2224 that is electrically connected with the MOSFETs 217 and 219 of the power module 211. That is, the MOSFETs 217 and 219 are grounded via the ground terminal 2224 formed in the connection part 222.

The ground terminal 2224 has an end portion 2225 inserted in the tubular portion 2221. The end portion 2225 is located between the tubular member 2223 and the bottom part 111 of the first frame 11 and in contact with a metal bolt 201 that corresponds to a □fixing member□.

The bolt 201 is inserted through the tubular member 2223 placed in the through-hole 2220 of the tubular portion 2221 and a through-hole (not shown) formed in the end portion 2225 of the ground terminal 2224; then, the bolt 201 is fastened into a first tapped hole 117 in the bottom part 111 of the first frame 11. Consequently, the ground terminal 2224 is both electrically and mechanically connected to the first frame 11.

Figure 5:
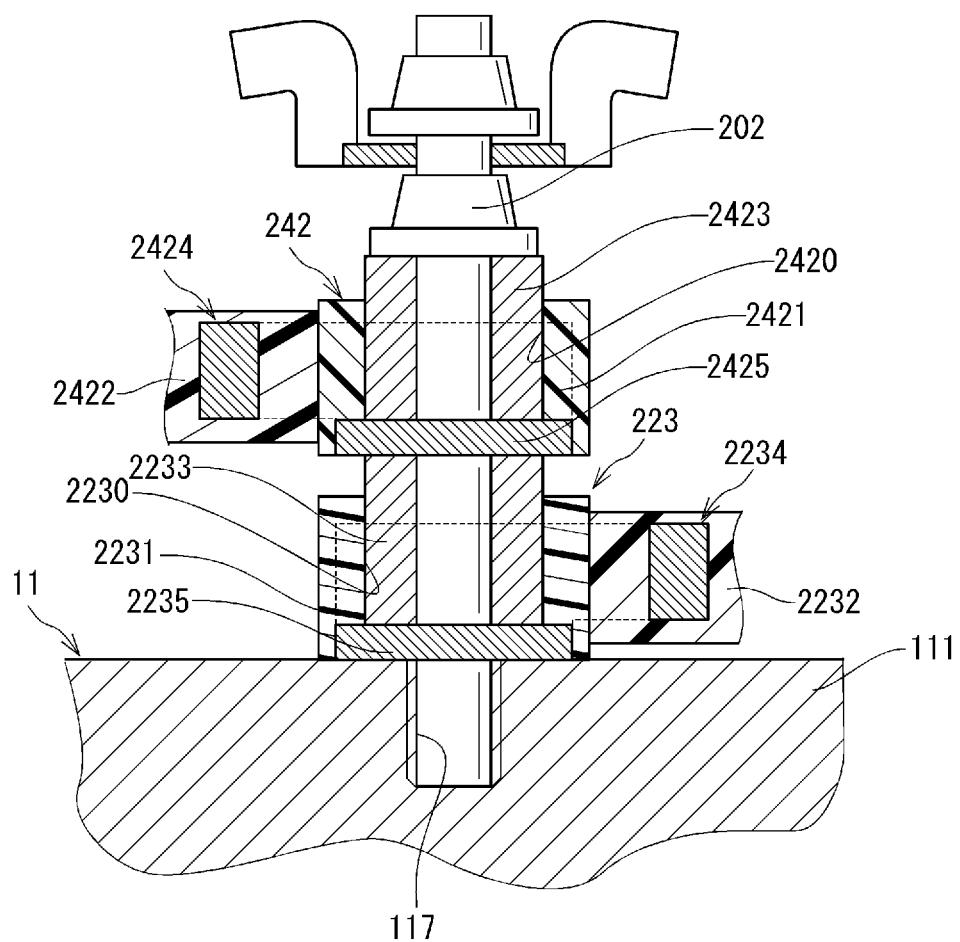
FIG. 5 is a cross-sectional view of the rotating electric machine taken along the line V-V in FIG. 3.

On the other hand, the connection part 223 is provided on the second control module 23 side of the supporting part 221. As shown in FIGS. 5 and 6, the connection part 223 includes a tubular portion 2231 and an intermediate portion 2232.

The tubular portion 2231 is tubular-shaped to have a through-hole 2230 formed therein. In the through-hole 2230, there is inserted a tubular member 2233 that is made of metal. The intermediate portion 2232 extends between the tubular portion 2231 and the supporting part 221 to connect them.

In the intermediate portion 2232 and the tubular portion 2231, there is inserted a ground terminal 2234 that is electrically connected with the MOSFETs 217 and 219 of the power module 211. That is, the MOSFETs 217 and 219 are grounded via the ground terminal 2234 formed in the connection part 223 as well.

The ground terminal 2234 has an end portion 2235 inserted in the tubular portion 2231. The end portion 2235 is located between the tubular member 2233 and the bottom part 111 of the first frame 11 and in contact with a metal bolt 202 that also corresponds to a □fixing member□.

Figure 7:
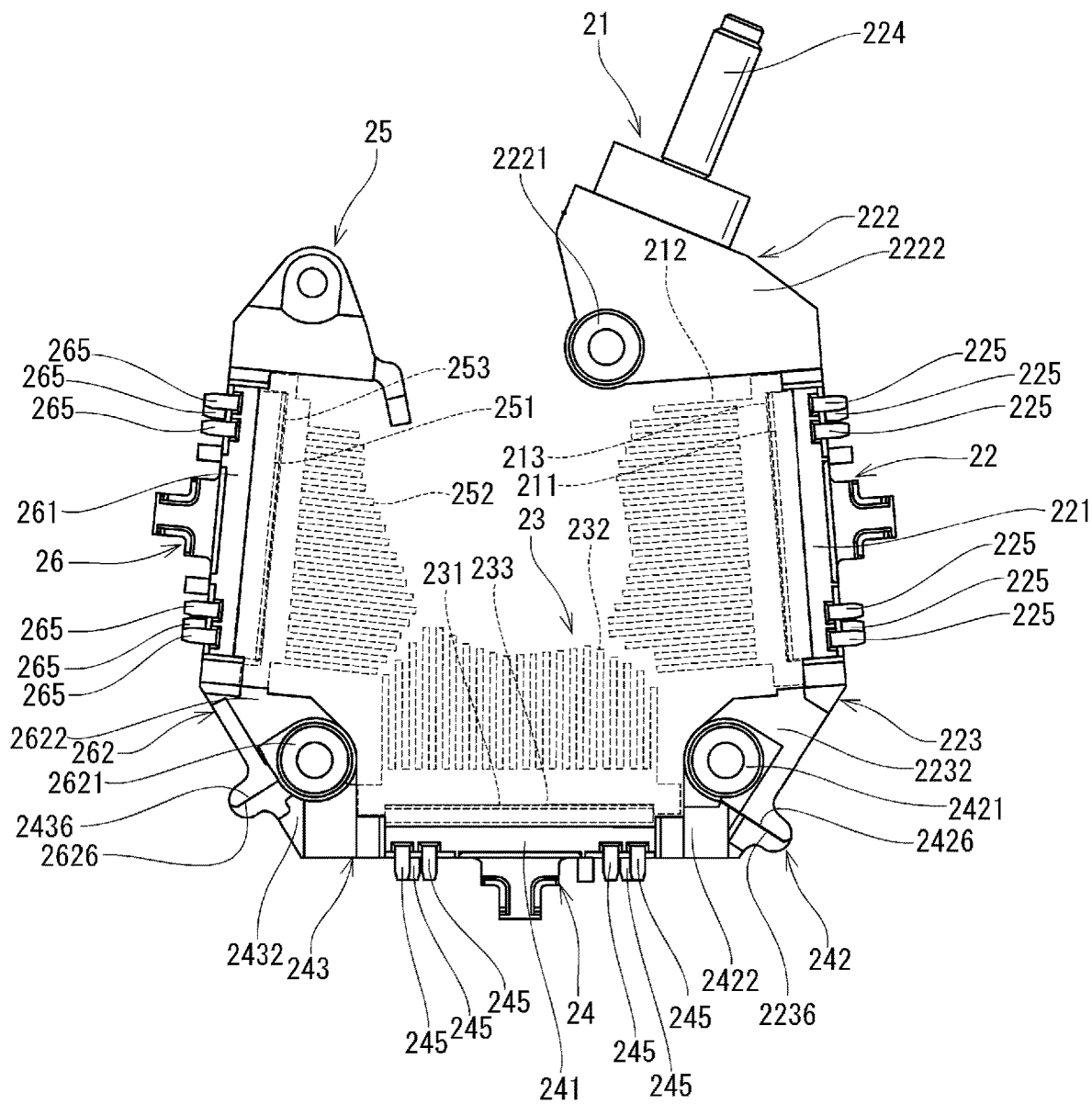
FIG. 7 is a schematic view illustrating the busbar assemblies of the control modules in a state of having been assembled to each other.

As shown in FIG. 6, the intermediate portion 2232 has, as a □positioning surface□, an abutting surface 2236 on the second control module 23 side. After the first, second and third control modules 21, 23 and 25 are assembled to each other as shown in FIG. 7, the abutting surface 2236 of the intermediate portion 2232 abuts an abutting surface 2426 provided in the second control module 23.

The power supply terminal 224 is provided on the opposite side of the connection part 222 to the supporting part 221. The power supply terminal 224 is electrically connected with the busbar of the busbar assembly 22. Moreover, the power supply terminal 224 is also electrically connected to a positive terminal of the battery 5 (see FIG. 2) via an electric wire (not shown).

The second control module 23 is an assembly of components for forming the first inverter circuit, a second inverter circuit, the first rectification circuit and a second rectification circuit of the rotating electric machine 1. As shown in FIG. 3, the second control module 23 includes a power module 231, the aforementioned heat sink 232, and a busbar assembly 24.

The power module 231 is a switching element module which includes two switching elements for forming the first inverter circuit and the first rectification circuit and two switching elements for forming the second inverter circuit and the second rectification circuit, more particularly two MOSFETs 236 and 237 for forming the first inverter circuit and the first rectification circuit and two MOSFETs 238 and 239 for forming the second inverter circuit and the second rectification circuit as shown in FIG. 2 in the present embodiment. The MOSFETs 236 and 237 are electrically connected in series with each other such that the source of the MOSFET 236 is electrically connected to the drain of the MOSFET 237. Similarly, the MOSFETs 238 and 239 are electrically connected in series with each other such that the source of the MOSFET 238 is electrically connected to the drain of the MOSFET 239.

As shown in FIG. 3, the heat sink 232 is provided on the rotation axis CAO side of the power module 231, i.e., on the radially inner side of the power module 231. In other words, the heat sink 232 is located closer than the power module 231 to the rotation axis CAO of the rotating shaft 15. The heat sink 232 is made of metal and configured to dissipate heat generated in the power module 231. More specifically, the heat sink 232 is configured to have a plurality of plate-shaped fins arranged parallel with each other in a direction substantially perpendicular to the rotation axis CAO of the rotating shaft 15.

In the present embodiment, between the power module 231 and the heat sink 232, there is provided an insulative adhesive 233 that corresponds to a □joining member□. The insulative adhesive 233 joins the heat sink 232 to the power module 231 while electrically insulating the heat sink 232 from the power module 231.

The busbar assembly 24 is an assembly of components for wiring and insulatively supporting the power module 231.

The busbar assembly 24 includes a busbar (not shown) electrically connected with the power module 231, a supporting part 241, and connection parts 242 and 243.

In the present embodiment, the supporting part 241 and the connection parts 242 and 243 are integrally formed of resin into one piece. Moreover, the busbar assembly 24 is joined to the heat sink 232 by heat-caulking. More specifically, the busbar assembly 24 is joined to the heat sink 232 by caulking the resin-made supporting part 241 and connection parts 242 and 243 of the busbar assembly 24 to the heat sink 232 while heating the supporting part 241.

The supporting part 241 is provided, on the opposite side of the power module 231 to the heat sink 232 (i.e., on the radially outer side of the power module 231), to support the power module 231. The supporting part 241 has a plurality of terminals 245 (see FIG. 6) on its opposite side to the power module 231 (i.e., on its radially outer side); the terminals 245 are electrically connected with the MOSFETs 236-239 of the power module 231.

The connection part 242 is provided on the first control module 21 side of the supporting part 241. As shown in FIGS. 5 and 6, the connection part 242 includes a tubular portion 2421 and an intermediate portion 2422.

The tubular portion 2421 is tubular-shaped to have a through-hole 2420 formed therein. In the through-hole 2420, there is inserted a tubular member 2423 that is made of metal. The intermediate portion 2422 extends between the tubular portion 2421 and the supporting part 241 to connect them.

In the intermediate portion 2422 and the tubular portion 2421, there is inserted a ground terminal 2424 that is electrically connected with the MOSFETs 237 and 239 of the power module 231. That is, the MOSFETs 237 and 239 are grounded via the ground terminal 2424 formed in the connection part 242.

The ground terminal 2424 has an end portion 2425 inserted in the tubular portion 2421. The end portion 2425 is located between the tubular member 2423 and the tubular member 2233 of the first control module 21 and in contact with the bolt 202.

The bolt 202 is inserted through the tubular member 2423 placed in the through-hole 2420 of the tubular portion 2421, a through-hole (not shown) formed in the end portion 2425 of the ground terminal 2424, the tubular member 2233 placed in the through-hole 2230 of the tubular portion 2231 and a through-hole (not shown) formed in the end portion 2235 of the ground terminal 2234; then, the bolt 202 is fastened into a second tapped hole 117 in the bottom part 111 of the first frame 11. Consequently, the ground terminals 2424 and 2234 are together both electrically and mechanically connected to the first frame 11.

As shown in FIG. 6, the intermediate portion 2422 has, as a □positioning surface□, the aforementioned abutting surface 2426 on the first control module 21 side. As described previously, after the first, second and third control modules 21, 23 and 25 are assembled to each other as shown in FIG. 7, the abutting surface 2426 of the intermediate portion 2422 abuts the abutting surface 2236 of the intermediate portion 2232 provided in the first control module 21.

On the other hand, the connection part 243 is provided on the third control module 25 side of the supporting part 241. As shown in FIG. 6, the connection part 243 includes a tubular portion 2431 and an intermediate portion 2432.

The tubular portion 2431 is tubular-shaped to have a through-hole formed therein. In the through-hole, there is inserted a tubular member that is made of metal. The intermediate portion 2432 connects the tubular portion 2431 and the supporting part 241.

In the intermediate portion 2432 and the tubular portion 2431, there is inserted a ground terminal that is electrically connected with the MOSFETs 237 and 239 of the power module 231. That is, the MOSFETs 237 and 239 are grounded via the ground terminal formed in the connection part 243 as well.

Though not shown in the figures, the ground terminal has an end portion inserted in the tubular portion 2431. The end portion is located between the tubular member inserted in the through-hole of the tubular portion 2431 and the bottom part 111 of the first frame 11 and in contact with a metal bolt 203 (see FIG. 3) that also corresponds to a □fixing member□.

As shown in FIG. 6, the intermediate portion 2432 has, as a □positioning surface□, an abutting surface 2436 on the third control module 25 side. After the first, second and third control modules 21, 23 and 25 are assembled to each other as shown in FIG. 7, the abutting surface 2436 of the intermediate portion 2432 abuts an abutting surface 2626 provided in the third control module 25.

The third control module 25 is an assembly of components for forming the second inverter circuit and the second rectification circuit of the rotating electric machine 1. As shown in FIG. 3, the third control module 25 includes a power module 251, the aforementioned heat sink 252, and a busbar assembly 26.

The power module 251 is a switching element module which includes four switching elements for forming the second inverter circuit and the second rectification circuit, more particularly four MOSFETs 256, 257, 258 and 259 as shown in FIG. 2 in the present embodiment. The MOSFETs 256 and 257 are electrically connected in series with each other such that the source of the MOSFET 256 is electrically connected to the drain of the MOSFET 257. Similarly, the MOSFETs 258 and 259 are electrically connected in series with each other such that the source of the MOSFET 258 is electrically connected to the drain of the MOSFET 259.

As shown in FIG. 3, the heat sink 252 is provided on the rotation axis CAO side of the power module 251, i.e., on the radially inner side of the power module 251. In other words, the heat sink 252 is located closer than the power module 251 to the rotation axis CAO of the rotating shaft 15. The heat sink 252 is made of metal and configured to dissipate heat generated in the power module 251. More specifically, the heat sink 252 is configured to have a plurality of plate-shaped fins arranged parallel with each other in a direction substantially perpendicular to the rotation axis CAO of the rotating shaft 15.

In the present embodiment, between the power module 251 and the heat sink 252, there is provided an insulative adhesive 253 that corresponds to a □joining member□. The insulative adhesive 253 joins the heat sink 252 to the power module 251 while electrically insulating the heat sink 252 from the power module 251.

The busbar assembly 26 is an assembly of components for wiring and insulatively supporting the power module 251. The busbar assembly 26 includes a busbar (not shown) electrically connected with the power module 251, a supporting part 261 and a connection part 262.

In the present embodiment, the supporting part 261 and the connection part 262 are integrally formed of resin into one piece. Moreover, the busbar assembly 26 is joined to the heat sink 252 by heat-caulking. More specifically, the busbar assembly 26 is joined to the heat sink 252 by caulking the resin-made supporting part 261 and connection part 262 of the busbar assembly 26 to the heat sink 252 while heating the supporting part 261.

The supporting part 261 is provided, on the opposite side of the power module 251 to the heat sink 252 (i.e., on the radially outer side of the power module 251), to support the power module 251. The supporting part 261 has a plurality of terminals 265 (see FIG. 6) on its opposite side to the power module 251 (i.e., on its radially outer side); the terminals 265 are electrically connected with the MOSFETs 256-259 of the power module 251.

The connection part 262 is provided on the second control module 23 side of the supporting part 261. As shown in FIG. 6, the connection part 262 includes a tubular portion 2621 and an intermediate portion 2622.

The tubular portion 2621 is tubular-shaped to have a through-hole formed therein. In the through-hole, there is inserted a tubular member that is made of metal. The intermediate portion 2622 extends between the tubular portion 2621 and the supporting part 261 to connect them.

In the intermediate portion 2622 and the tubular portion 2621, there is inserted a ground terminal that is electrically connected with the MOSFETs 257 and 259 of the power module 251. That is, the MOSFETs 257 and 259 are grounded via the ground terminal formed in the connection part 262.

Though not shown in the figures, the ground terminal has an end portion inserted in the tubular portion 2621. The end portion is located between the tubular member inserted in the through-hole of the tubular portion 2621 and the tubular member inserted in the through-hole of the tubular portion 2431 of the connection part 243 of the second control module 23 and in contact with the bolt 203.

The bolt 203 is inserted through the tubular member placed in the through-hole of the tubular portion 2621, a through-hole formed in the end portion of the ground terminal inserted in the connection part 262, the tubular member placed in the through-hole of the tubular portion 2431 of the connection part 243 of the second control module 23 and a through-hole formed in the end portion of the ground terminal inserted in the connection part 243 of the second control module 23; then, the bolt 203 is fastened into a third tapped hole 117 (not shown) in the bottom part 111 of the first frame 11. Consequently, the ground terminal inserted in the connection part 262 of the third control module 25 and the ground terminal inserted in the connection part 243 of the second control module 23 are together both electrically and mechanically connected to the first frame 11.

As shown in FIG. 6, the intermediate portion 2622 has, as a □positioning surface□, the aforementioned abutting surface 2626 on the second control module 23 side. As described previously, after the first, second and third control modules 21, 23 and 25 are assembled to each other as shown in FIG. 7, the abutting surface 2626 of the intermediate portion 2622 abuts the abutting surface 2436 of the intermediate portion 2432 provided in the second control module 23.

The slip rings 27 and the brushes 28 are provided for supplying direct current (i.e., excitation current) to the rotor coil 142. Each of the slip rings 27 is fixed to an outer circumferential surface of the rotating shaft 15 via an insulating member. The brushes 28 are held by a brush holder 282 so that each of the brushes 28 has its distal end surface in pressed contact with an outer circumferential surface of a corresponding one of the slip rings 27. More specifically, each of the brushes 28 is pressed against the outer circumferential surface of the corresponding slip ring 27 by a spring 281 provided in the brush holder 282.

The cover 30 is provided to cover the control section 20 from the opposite side of the control section 20 to the first frame 11 (i.e., on the outside of the first frame 11), thereby protecting the control section 20 from foreign substances such as water and dust. In addition, the cover 30 is made of resin.

Next, a manufacturing method of the rotating electric machine 1 according to the present embodiment will be described.

In the present embodiment, the manufacturing method of the rotating electric machine 1 includes a first assembly step, a second assembly step and a fixing step. In the first assembly step, the second control module 23 is assembled to the bottom part 111 of the first frame 11 from the opposite side of the bottom part 111 to the accommodation space 100. In the second assembly step, the first and third control modules 21 and 25 are assembled to the bottom part 111 of the first frame 11 so as to be located adjacent to the second control module 23 respectively on opposite sides of the second control module 23, as indicated with blank arrows in FIG. 6. More specifically, in the second assembly step, the first and third control modules 21 and 25 are assembled to the bottom part 111 of the first frame 11 so as to bring the abutting surface 2236 of the first control module 21 into abutment with the abutting surface 2426 of the second control module 23 and the abutting surface 2626 of the third control module 25 into abutment with the abutting surface 2436 of the second control module 23 as shown in FIG. 7. In the fixing step, the first, second and third control modules 21, 23 and 25 are fixed to the bottom part 111 of the first frame 11 by means of the bolts 201, 202 and 203.

Next, operation of the rotating electric machine 1 will be described with reference to FIGS. 1 and 2.

As described previously, in the present embodiment, the rotating electric machine 1 is configured as a motor-generator to selectively operate in a motor mode and a generator mode in a vehicle.

In the motor mode, upon an ignition switch (not shown) of the vehicle being turned on, direct current is supplied from the battery 5 to the rotor coil 142 via the brushes 28 and the slip rings 27, causing magnetic poles to be formed on a radially outer periphery of the rotor 14. At the same time, direct current is also supplied from the battery 5 to the power modules 211, 231 and 251. Then, the six MOSFETs 216, 217, 218, 219, 236 and 237, which together form the first inverter circuit, are turned on or off at predetermined timings, thereby converting the direct current supplied from the battery 5 into three-phase alternating current. Similarly, the six MOSFETs 238, 239, 256, 257, 258 and 259, which together form the second inverter circuit, are also turned on or off at predetermined timings, thereby converting the direct current supplied from the battery 5 into three-phase alternating current. However, the predetermined timings at which the six MOSFETs forming the second inverter circuit are turned on or off are different from the predetermined timings at which the six MOSFETs forming the first inverter circuit are turned on or off. Consequently, the three-phase alternating current outputted from the second inverter circuit is different in phase from the three-phase alternating current outputted from the first inverter circuit. The three-phase alternating current outputted from the first inverter circuit and the three-phase alternating current outputted from the second inverter circuit are respectively supplied to the first and second three-phase stator coils 133 and 134, causing the machine main body 10 to generate drive power for driving the vehicle.

In the generator mode, direct current is supplied from the battery 5 to the rotor coil 142 via the brushes 28 and the slip rings 27, causing magnetic poles to be formed on the radially outer periphery of the rotor 14. Moreover, drive power is transmitted from the crankshaft of the engine of the vehicle to the connection part 121 of the machine main body 10, causing three-phase alternating current to be generated in each of the first and second three-phase stator coils 133 and 134. Then, the six MOSFETs 216, 217, 218, 219, 236 and 237, which together form the first rectification circuit, are turned on or off at predetermined timings, thereby rectifying the three-phase alternating current generated in the first three-phase stator coil 133 into direct current. Similarly, the six MOSFETs 238, 239, 256, 257, 258 and 259, which together form the second rectification circuit, are also turned on or off at predetermined timings, thereby rectifying the three-phase alternating current generated in the second three-phase stator coil 134 into direct current. Both the direct current outputted from the first rectification circuit and the direct current outputted from the second rectification circuit are supplied to the battery 5 to charge it.

According to the present embodiment, it is possible to achieve the following advantageous effects.

In the rotating electric machine 1 according to the present embodiment, the first frame 11 is grounded. The first, second and third control modules 21, 23 and 25 are arranged around the rotating shaft 15 and adjacent to one another (see FIG. 3). The busbar assembly 22 of the first control module 21 includes the connection parts 222 and 223 each of which is fixed to the first frame 11 and has one ground terminal formed therein. The MOSFETs 217 and 219 of the power module 211 are grounded via the ground terminals formed in the connection parts 222 and 223. The busbar assembly 24 of the second control module 23 includes the connection parts 242 and 243 each of which is fixed to the first frame 11 and has one ground terminal formed therein. The MOSFETs 237 and 239 of the power module 231 are grounded via the ground terminals formed in the connection parts 242 and 243. The busbar assembly 26 of the third control module 25 includes the connection part 262 that is fixed to the first frame 11 and has one ground terminal formed therein. The MOSFETs 257 and 259 of the power module 251 are grounded via the ground terminal formed in the connection part 262. The connection part 223 of the busbar assembly 22 of the first control module 21 and the connection part 242 of the busbar assembly 24 of the second control module 23, which are adjacent to each other, are together fixed to the first frame 11 by the bolt 202 (see FIG. 3). Moreover, the ground terminals 2234 and 2424 respectively formed in the connection parts 223 and 242 are together electrically connected to the first frame 11 (see FIG. 5). Similarly, the connection part 243 of the busbar assembly 24 of the second control module 23 and the connection part 262 of the busbar assembly 26 of the third control module 25, which are adjacent to each other, are together fixed to the first frame 11 by the bolt 203 (see FIG. 3). Moreover, the ground terminals respectively formed in the connection parts 243 and 262 are together electrically connected to the first frame 11.

With the above configuration, all the connection parts 222, 223, 242, 243 and 262 of the first, second and third control modules 21, 23 and 25 have the same electrical potential as the first frame 11, i.e., the ground potential. Therefore, in fixing the connection parts 222, 223, 242, 243 and 262 of the control modules 21, 23 and 25 to the first frame 11, it is unnecessary to provide any insulating members between the connection parts 222, 223, 242, 243 and 262 and the first frame 11. Consequently, it becomes possible to prevent any leakage paths of electric current from being formed in the rotating electric machine 1 due to aging deterioration of insulating members. As a result, it becomes possible to ensure insulation properties of the control modules 21, 23 and 25 over a long period of time.

In the rotating electric machine 1 according to the present embodiment, the first control module 21 has the insulative adhesive 213 provided between the power module 211 and the heat sink 212 to join the heat sink 212 to the power module 211 while electrically insulating the heat sink 212 from the power module 211. The second control module 23 has the insulative adhesive 233 provided between the power module 231 and the heat sink 232 to join the heat sink 232 to the power module 231 while electrically insulating the heat sink 232 from the power module 231. The third control module 25 has the insulative adhesive 253 provided between the power module 251 and the heat sink 252 to join the heat sink 252 to the power module 251 while electrically insulating the heat sink 252 from the power module 251.

With the above configuration, the heat sinks 212, 232 and 252 are respectively electrically insulated from the power modules 211, 231 and 251 by the insulative adhesives 213, 233 and 253 and thus have a floating potential. Consequently, even if the heat sinks 212, 232 and 252 are accidently caused to have either of the higher and lower potentials of the MOSFETS of the power modules 211, 231 and 251, it will still be possible to prevent a short circuit from occurring in the rotating electric machine 1.

In the rotating electric machine 1 according to the present embodiment, in the first control module 21, the supporting part 221 and connection parts 222 and 223 of the busbar assembly 22 are integrally formed into one piece, and joined to the heat sink 212 by heat-caulking. In the second control module 23, the supporting part 241 and connection parts 242 and 243 of the busbar assembly 24 are integrally formed into one piece, and joined to the heat sink 232 by heat-caulking. In the third control module 25, the supporting part 261 and connection part 262 of the busbar assembly 26 are integrally formed into one piece, and joined to the heat sink 252 by heat-caulking. Consequently, it becomes possible to simplify the structure of the control modules 21, 23 and 25.

In the rotating electric machine 1 according to the present embodiment, as described above, all the connection parts 222, 223, 242, 243 and 262 of the control modules 21, 23 and 25 have the same electrical potential as the first frame 11. Consequently, it becomes possible to provide the metal-made tubular members in the connection parts 222, 223, 242, 243 and 262. For example, the tubular member 2223 is inserted in the through-hole 2220 formed in the tubular portion 2221 of the connection part 222. The tubular member 2233 is inserted in the through-hole 2230 formed in the tubular portion 2231 of the connection part 223. The tubular member 2423 is inserted in the through-hole 2420 formed in the tubular portion 2421 of the connection part 242. As a result, with the metal-made tubular members, the connection parts 222, 223, 242, 243 and 262 of the control modules 21, 23 and 25 are reinforced (i.e., the mechanical strength of the connection parts 222, 223, 242, 243 and 262 are enhanced).

In the rotating electric machine 1 according to the present embodiment, as described above, the connection part 223 of the busbar assembly 22 of the first control module 21 and the connection part 242 of the busbar assembly 24 of the second control module 23, which are adjacent to each other, are together fixed to the first frame 11 by the metal bolt 202.

Moreover, the ground terminals 2234 and 2424 respectively formed in the connection parts 223 and 242 are together electrically connected by the metal bolt 202 to the first frame 11 and thereby grounded. Similarly, the connection part 243 of the busbar assembly 24 of the second control module 23 and the connection part 262 of the busbar assembly 26 of the third control module 25, which are adjacent to each other, are together fixed to the first frame 11 by the metal bolt 203. Moreover, the ground terminals respectively formed in the connection parts 243 and 262 are together electrically connected by the metal blot 203 to the first frame 11 and thereby grounded.

With the above configuration, it becomes possible to reduce the number of the metal blots employed to fix the connection parts 222, 223, 242, 243 and 262 of the control modules 21, 23 and 25 to the first frame 11 and thus the space required for fastening the metal blots to fix the connection parts 222, 223, 242, 243 and 262 to the first frame 11.

The manufacturing method of the rotating electric machine 1 according to the present embodiment includes the first and second assembly steps. In the first assembly step, the second control module 23 is assembled to the bottom part 111 of the first frame 11. In the second assembly step, the first and third control modules 21 and 25 are assembled to the bottom part 111 of the first frame 11 so as to bring the abutting surface 2236 of the first control module 21 into abutment with the abutting surface 2426 of the second control module 23 and the abutting surface 2626 of the third control module 25 into abutment with the abutting surface 2436 of the second control module 23 (see FIG. 7). Consequently, it becomes possible to easily and accurately position the first, second and third control modules 21, 23 and 25 with respect to each other. As a result, it becomes possible to reliably assemble the control modules 21, 23 and 25 to desired positions on the bottom part 111 of the first frame 11.

In addition, after fixing the control modules 21, 23 and 25 to the bottom part 111 of the first frame 11 in the subsequent fixing step, those parts of the terminals 225, 245 and 265 of the control modules 21, 23 and 25 which have the same electric potential can be welded at the boundaries between the first and second control modules 21 and 23 and between the second and third control modules 23 and 25 without imposing any load on those parts of the terminals 225, 245 and 265.

Accordingly, with the manufacturing method according to the present embodiment, it becomes possible to easily and accurately assemble the control modules 21, 23 and 25 to the bottom part 111 of the first frame 11, thereby lowering the manufacturing cost while ensuring the reliability of the rotating electric machine 1.

While the above particular embodiment has been shown and described, it will be understood by those skilled in the art that various modifications, changes, and improvements may be made without departing from the spirit of the present disclosure.

For example, in the above-described embodiment, the rotting electric machine 1 is designed to be used in a vehicle. However, the present disclosure can also be applied to rotating electric machines for other uses.

In the above-described embodiment, the heat sinks 212, 232 and 252 are respectively joined to the power modules 211, 231 and 251 by the insulative adhesives 213, 233 and 253. However, the heat sinks 212, 232 and 252 may alternatively be respectively joined to the power modules 211, 231 and 251 by other joining members which are not electrically insulative.

In the above-described embodiment, the busbar assemblies 22, 24 and 26 are respectively joined to the heat sinks 212, 232 and 252 by heat-caulking. However, the busbar assemblies 22, 24 and 26 may alternatively be respectively joined to the heat sinks 212, 232 and 252 by other joining methods.

In the above-described embodiment, the tubular members, which are respectively inserted in the through-holes formed in the connection parts of the busbar assemblies 22, 24 and 26, are made of metal. However, provided that the end portions of the ground terminals formed in the connection parts of the busbar assemblies 22, 24 and 26 are respectively in contact with the corresponding metal bolts 201, 202 and 203, the tubular members may alternatively be made of a nonmetal material.

In the above-described embodiment, the control modules 21, 23 and 25 have the abutting surfaces 2236, 2426, 2436 and 2626 formed therein as the positioning surfaces for positioning the control modules 21, 23 and 25 with respect to each other. However, the control modules 21, 23 and 25 may alternatively have no positioning surfaces formed therein.

In the above-described embodiment, there are formed the four positioning surfaces (i.e., the abutting surfaces 2236, 2426, 2436 and 2626) respectively in the connection part 223 of the first control module 21, the connection part 242 of the second control module 23, the connection part 243 of the second control module 23 and the connection part 262 of the third control module 25. That is, each of the connection parts 223, 242, 243 and 262 has one positioning surface formed therein. However, each of the connection parts 223, 242, 243 and 262 may have two or more positioning surfaces formed therein. Moreover, the positioning surfaces may alternatively be formed in other parts of the control modules 21, 23 and 25 than the connection parts.

In the above-described embodiment, the MOSFETs are employed in the power modules 211, 231 and 251. However, other switching elements, such as diodes, may alternatively be employed in the power modules 211, 231 and 251.

In the above-described embodiment, the stator 13 includes two three-phase stator coils, i.e., the first three-phase stator coil 133 and the second three-phase stator coil 134. Moreover, the MOSFETs forming the first inverter circuit that converts the direct current supplied from the battery 5 into the three-phase alternating current supplied to the first three-phase stator coil 133 are turned on or off at different predetermined timings from the MOSFETs forming the second inverter circuit that converts the direct current supplied from the battery 5 into the three-phase alternating current supplied to the second three-phase stator coil 134. However, the stator 13 may alternatively include only one three-phase stator coil.

In addition, in the above-described embodiment, by turning on or off the MOSFETs forming the first inverter circuit at different predetermined timings from the MOSFETs forming the second inverter circuit, it is possible to reduce noise included in the three-phase alternating currents outputted from the first and second inverter circuits.

What is claimed is:

1. A rotating electric machine comprising:
 a rotating shaft;
 a rotor fixed on the rotating shaft to rotate together with the rotating shaft; a stator provided radially outside the rotor and including a stator coil;
 a housing that rotatably supports the rotating shaft and accommodates both the rotor and the stator therein, the housing being grounded;

a plurality of control modules capable of supplying multi-phase alternating current to the stator coil and rectifying multi-phase alternating current generated in the stator coil into direct current, the control modules being arranged around the rotating shaft and adjacent to one another, each of the control modules including a plurality of switching elements electrically connected with the stator coil, a supporting part that supports the switching elements, and at least one connection part fixed to the housing and having formed therein a ground terminal, wherein the switching elements are grounded via the ground terminal; and a plurality of fixing members provided to fix the connection parts of the control modules to the housing, wherein each adjacent pair of the connection parts respectively belonging to two different ones of the control modules are together fixed to the housing by a corresponding one of the fixing members, and the ground terminals formed in the adjacent pair of the connection parts are together electrically connected to the housing.

2. The rotating electric machine as set forth in claim 1, wherein each of the control modules further includes a heat sink provided to dissipate heat generated in the switching elements, and a joining member provided between the heat sink and the switching elements to join the heat sink to the switching elements while electrically insulating the heat sink from the switching elements, and in each of the control modules, the supporting part and the at least one connection part are integrally formed into one piece, and joined to the heat sink by caulking.

3. The rotating electric machine as set forth in claim 1, wherein each of the fixing members is constituted of metal bolt, and in each of the connection parts of the control modules, there is provided a tubular member that is made of metal and the corresponding fixing member extends through the tubular member.

4. The rotating electric machine as set forth in claim 1, wherein each of the control modules has at least one positioning surface, by the at least one positioning surface the control module is positioned with respect to another of the control modules, wherein the at least one positioning surface is located adjacent to the control module.

5. The rotating electric machine as set forth in claim 4, wherein in each of the control modules, the at least one positioning surface is formed in the at least one connection part of the control module.

6. The rotating electric machine as set forth in claim 1, wherein each of the fixing members is constituted of metal bolt, and for each adjacent pair of the connection parts respectively belonging to two different ones of the control modules, the ground terminals formed in the adjacent pair of the connection parts are arranged in contact with the corresponding fixing member and thus together electrically connected to the housing by the corresponding fixing member.

* * * * *